(No Model.)

A. P. BROOMELL.
GLOBE VALVE.

No. 260,000. Patented June 27, 1882.

WITNESSES
Franck L. Durand
O. E. Fansmann

INVENTOR
A. P. Broomell
By his attorney
Charles E. Foster

UNITED STATES PATENT OFFICE.

ALBERT P. BROOMELL, OF YORK, PENNSYLVANIA, ASSIGNOR TO FREY & BROOMELL, OF SAME PLACE.

GLOBE-VALVE.

SPECIFICATION forming part of Letters Patent No. 260,000, dated June 27, 1882.

Application filed February 25, 1882. (No model.)

*To all whom it may concern:*

Be it known that I, ALBERT P. BROOMELL, a citizen of the United States, and a resident of York, in the county of York and State of Pennsylvania, have invented certain new and useful Improvements in Globe-Valves, of which the following is a specification.

My invention is a globe-valve constructed, as fully described hereinafter, to secure a tight packing around the spindle, whatever may be the position of the valve, to prevent wearing of the valve-seat, to facilitate the grinding thereof, and secure a speedy and effective adjustment of the packing-follower.

Figure 1:
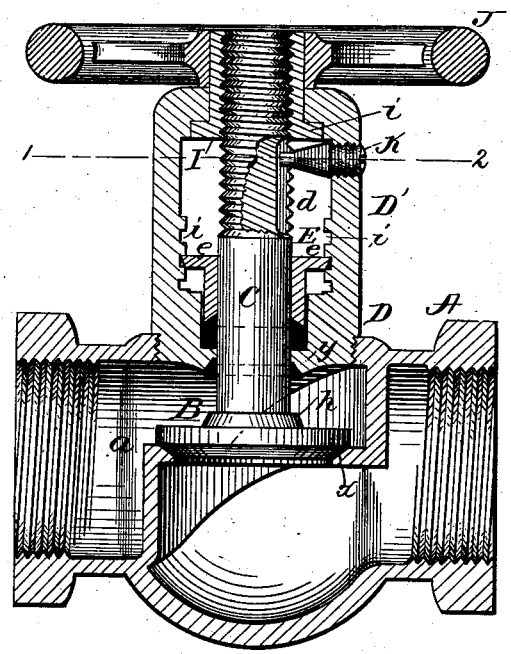
Figure 2:
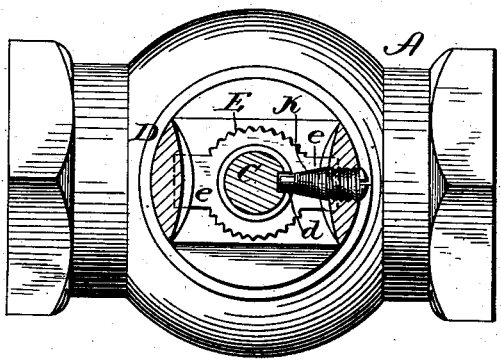

In the drawings, Figure 1 is a sectional elevation of the valve, showing my improvements; and Fig. 2 is a sectional plan on the line 1 2, Fig. 1.

The casing A is constructed in the usual manner and provided with a partition, $a$, having a center opening with a beveled edge, forming a seat, $x$, for the disk-valve B, which is connected to and forms part of the stem C. The casing A has at the top an opening large enough to admit the valve and threaded to receive the threaded end of a plug, D, over which extends a yoke, D', as shown.

The valve-spindle extends through a packing-box in the plug D, which box is provided with a follower, E, having arms $e$, which may be turned so as to enter recesses $i$ at the inner sides of the arms of the yoke D', the follower being secured, after the packing has been compressed to the desired extent, by turning it to the position shown in Fig. 1, with its arms within two of said recesses, whereby its upward movements are prevented. This arrangement prevents the wearing of the spindle and packing and undue friction, apt to result when the ordinary screw-follower is employed, the attendants frequently turning them to such an extent as to secure an enormous pressure upon the packing with the injurious results named.

The cross-bar of the yoke D' is recessed to receive a flanged nut, I, adapted to the threaded end of the spindle C, the annular flange $i$ of the nut preventing any upward movements, and the hand-wheel J, secured to the projecting end of the nut, preventing its descent. The spindle C is of such a length that its upper end will be flush with the face of the nut when the valve B is upon the seat.

At one side of the spindle is a slot, $d$, into which projects the end of the finger K, extending from the yoke D', thereby preventing any turning of the spindle, so that the revolution of the hand-wheel and its nut will raise and lower the valve without turning it upon its seat, thereby avoiding the irregular wear of the latter. The position of the end of the valve-spindle in relation to the face of the nut will at all times indicate to the engineer the position of the valve in relation to the seat. As the valve is secured permanently and rigidly to the stem, it may be ground more readily to its seat than if the connection was loose. As the screw is exposed, it is easily lubricated, while the length of the nut prevents undue wear.

In order to permit the packing to be replaced while the steam is passing through the casing, I provide the valve with a second beveled face, $h$, adapted to a seat, $y$, at the lower end of the plug D, so that when the valve is raised to the limit of its upward movement the passage of steam into the packing-box is prevented. As the spindle cannot be turned, the wearing of the face $h$ in its seat is prevented.

I claim—

1. The combination, in a globe-valve, of a casing, A, having a partition, $a$, seat $x$, and valve B, adapted to said seat and formed in one piece with the threaded and slotted stem C, and yoke D', receiving the nut I, adapted to the valve-stem, and the finger K, extending into the slot of the stem, substantially as set forth.

2. The combination of the valve-casing, threaded and slotted valve-stem, valve B, having faces $x$ $h$, elevating-nut I, finger K, packing-box surrounding the valve-stem, and seat $y$ below the packing-box, substantially as specified.

3. The combination of the casing, valve-stem, packing-box, and follower having arms $e$, adapted to notches $i$ in the yoke above the casing, as specified.

4. The combination of the case, its valve and elevating-nut having a fixed support, and valve-stem of a length to be flush with the face of the nut when the valve is on its seat, substantially as specified.

In testimony whereof I have signed my name to this specification in the presence of two subscribing witnesses.

A. P. BROOMELL.

Witnesses:
CHARLES E. FOSTER,
A. E. HANSMANN.